J. E. LAGERGREN.
KINETOSCOPIC APPARATUS.
APPLICATION FILED MAR. 14, 1907.
939,274.
Patented Nov. 9, 1909.
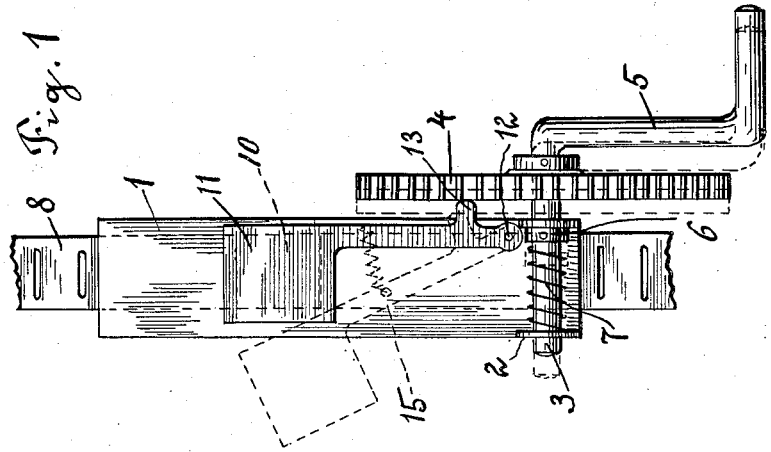
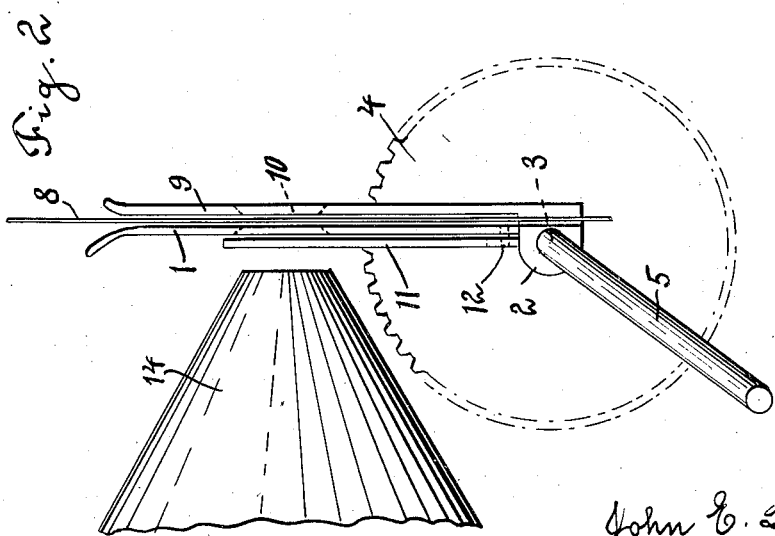
WITNESSES
Marvin F. Wood
S. Herzog
John E. Lagergren
INVENTOR
BY Joseph J. Sachers
ATTORNEY

UNITED STATES PATENT OFFICE.

JOHN E. LAGERGREN, OF NEW YORK, N. Y., ASSIGNOR, BY MESNE ASSIGNMENTS, TO THE IKONOGRAPH COMPANY OF AMERICA, OF NEW YORK, N. Y., A CORPORATION OF NEW YORK.

KINETOSCOPIC APPARATUS.

939,274.  Specification of Letters Patent.  Patented Nov. 9, 1909.

Application filed March 14, 1907. Serial No. 362,267.

*To all whom it may concern:*

Be it known that I, JOHN E. LAGERGREN, a citizen of the United States, and resident of New York, in the county of New York and State of New York, have invented certain new and useful Improvements in Kinetoscopic Apparatus, of which the following is a specification.

Kinetoscopy, *i. e.* the art of projecting images so as to produce the effect of life and motion, employs in some of its most successful devices as means for carrying pictures, flexible films, preferably made of celluloid or other similar products of nitrocellulose. It is a well known fact that this material is of a highly inflammable nature and, since in the projection of moving pictures it becomes necessary to condense rays of radiant energy, such as light, upon that part of the picture carrier just passing through the optical axis of a kinetoscopic apparatus, and since it may occur that, accidentally, the film is held stationary in the focal plane for an appreciable period of time, it may happen that the rays of radiant energy emanating from the source of light and heat and concentrated and condensed upon the film, cause instantaneous combustion of the film and, consequently, serious danger of fire. In order to avoid this danger, the present invention employs means between the source of radiant energy and the film, to intercept the rays when the film is kept stationary in the optical axis of the condensing and projecting lenses, while it allows the passage of the rays when the film is traveling. It will be seen that the operation of this means is directly opposite to the operation of the common shutter usually employed in apparatus of this general character, which latter intercepts the light when the film is traveling and allows the passage of light when the film is kept stationary.

The invention is illustrated in one of its forms in the accompanying drawing, in which—

Figure 1 is a front- and Fig. 2 a side-elevation of this improvement in kinetoscopic apparatus.

The frame 1 carries suitable bearing lugs 2 for a rotatable shaft 3. This shaft is provided with a gear 4, forming part of the train of gears for operating the picture carrying film or plate and is, as such part, well known in the art. A crank 5 serves to rotate the shaft 3 and a collar 6 on this shaft forms a rest for a helical spring 7, the other end of which bears against one of the lugs 2. A slight pressure on the crank in the direction of the axis of the shaft, causes a lateral displacement of the same and of gear 4 and, on ceasing the pressure, the spring 7 returns the shaft and gear to its normal position.

The flexible film or picture carrier 8 travels through the focal plane of the apparatus between the frame 1 and the plate 9, passing the opening 10 where it is illuminated by light focused upon it from a suitable source of light, held in the casing or lamphouse 14. A shutter 11 normally closes the opening 10 and prevents the light and heat rays from striking the picture film. The shutter is pivoted at 12 to the frame 1 and is provided with a nose 13, resting against the side of the gear 4. The lateral displacement of the shaft 3 and gear 4 causes a corresponding displacement of the shutter 11, whereby the opening 10 and the film 8, traveling therethrough, are exposed to the rays of radiant energy. The operator of the apparatus, in turning the crank for the purpose of moving the film, by a slight pressure in the direction of the axis of the shaft, also removes the shutter from the opening, while as soon as he ceases to operate the crank and removes his hand from the apparatus, the spring 15 returns the shutter to its normal position and intercepts the passage of light and heat from the lamphouse 14, so that when the film is at rest, it is not exposed to the rays of heat which may cause its combustion. It is not necessary that the shutter be made of opaque material, such as metal, hard rubber, etc., but the shutter may be made of any heat absorbing material, such as a plate of rock salt, mica, colored glass, etc., or may consist of a liquid cell containing a heat absorbent, such as a solution of alum, white or colored, etc.

As new and useful is claimed and desired to be secured by Letters Patent of the United States:—

1. The combination in a kinetoscope, of an axially movable driving shaft, a shutter, and means adapted to displace said shutter on axial movement of said shaft independent of its rotation.

2. The combination in a kinetoscope, of an axially movable driving shaft, a crank rigidly mounted on said shaft, a shutter, and means adapted to displace said shutter on axial movement of said shaft.

3. The combination in a kinetoscope with a frame, having an opening, of an axially movable driving shaft on said frame, a shutter for said opening, and means adapted to displace said shutter on axial movement of said shaft independent of its rotation.

4. The combination in a kinetoscope with a frame, having an opening, of an axially movable driving shaft on said frame, a crank rigidly mounted on said shaft, a shutter for said opening, and means adapted to displace said shutter on axial movement of said shaft.

In witness whereof I hereunto set my hand in the presence of two subscribing witnesses at New York, in the county of New York and State of New York, this 28th day of February, 1907.

JOHN E. LAGERGREN.

In presence of—
  RALPH J. SACHERS,
  S. HERZOG.